United States Patent
Lee (10) Patent No.: US 7,346,029 B2
(45) Date of Patent: Mar. 18, 2008

(54) METHOD OF PROCESSING TRAFFIC IN A MOBILE COMMUNICATION SYSTEM

(75) Inventor: Sang Ho Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 806 days.

(21) Appl. No.: 10/685,570

(22) Filed: Oct. 16, 2003

(65) Prior Publication Data
US 2004/0082339 A1 Apr. 29, 2004

(30) Foreign Application Priority Data
Oct. 17, 2002 (KR) ...................... 10-2002-0063549

(51) Int. Cl.
*H04Q 7/00* (2006.01)
(52) U.S. Cl. ...................... 370/329; 370/466; 455/450
(58) Field of Classification Search ...................... None
See application file for complete search history.

(56) References Cited

U.S. PATENT DOCUMENTS

| | | | |
|---|---|---|---|
| 6,317,435 B1* | 11/2001 | Tiedemann et al. | ......... 370/441 |
| 6,781,971 B1* | 8/2004 | Davis et al. | ................ 370/329 |
| 7,065,367 B2* | 6/2006 | Michaelis et al. | ....... 455/452.2 |
| 2001/0008520 A1* | 7/2001 | Tiedemann et al. | ......... 370/328 |
| 2002/0034170 A1* | 3/2002 | Tiedemann et al. | ......... 370/335 |
| 2003/0018803 A1* | 1/2003 | El Batt et al. | .............. 709/236 |
| 2003/0231594 A1* | 12/2003 | Xu et al. | ..................... 370/236 |
| 2004/0009751 A1* | 1/2004 | Michaelis et al. | ............ 455/62 |
| 2004/0030548 A1* | 2/2004 | El-Maleh et al. | ........... 704/230 |

* cited by examiner

*Primary Examiner*—Bob A. Phunkulh
(74) *Attorney, Agent, or Firm*—Ked & Associates, LLP (57) ABSTRACT

A system and method for communicating data assigns priorities to different types of traffic based on one or more system conditions. The method includes classifying different kinds of traffic, allocating a priority to each kind of classified traffic, and when data received including different kinds of traffic multiplexing the traffic and the received data and transmitting the data according to the allocated priority. The traffic may be classified into signaling traffic, data traffic, and voice traffic. The data traffic may further be classified as follows: an RLP control frame, an RLP new frame, as well as other RLP frames. The voice traffic may be classified as full-rate voice traffic, half-rate voice traffic, quarter-rate voice traffic, and eighth-rate voice traffic. The method may be further controlled based on the type of multiplexing to be performed. Through this system and method, it is possible to provide good quality SVD (service simultaneous voice and data) by avoiding interruptions in transmissions.

19 Claims, 10 Drawing Sheets

Fig. 1

RELATED ART

Fig. 2A

RELATED ART

| Transmit Rate (bits/sec) | MuxPDU Header | | | Primary Traffic (bits/block) | Signaling Traffic (bits/block) | Secondary Traffic (bits/block) | Permitted on | | | |
|---|---|---|---|---|---|---|---|---|---|---|
| | Mixed Mode (MM) | Traffic Type (TT) | Traffic Mode (TM) | | | | FCH | DCCH | SCCH | SCH |
| 9600 | '0' | - | - | 171 | 0 | 0 | Y | Y | Y | Y |
| | '1' | '0' | '00' | 80 | 88 | 0 | Y | Y | N | N |
| | '1' | '0' | '01' | 40 | 128 | 0 | Y | Y | N | N |
| | '1' | '0' | '10' | 16 | 152 | 0 | Y | Y | N | N |
| | '1' | '0' | '11' | 0 | 168 | 0 | Y | Y | N | N |
| | '1' | '1' | '00' | 80 | 0 | 88 | Y | Y | N | N |
| | '1' | '1' | '01' | 40 | 0 | 128 | Y | Y | N | N |
| | '1' | '1' | '10' | 16 | 0 | 152 | Y | Y | N | N |
| | '1' | '1' | '11' | 0 | 0 | 168 | Y | Y | Y | Y |
| 4800 | - | - | - | 80 | 0 | 0 | Y | N | N | N |
| 2400/2700 | - | - | - | 40 | 0 | 0 | Y | N | N | N |
| 1200/1500 | - | - | - | 16 | 0 | 0 | Y | N | N | N |

Fig. 2B

RELATED ART

| Transmit Rate (bits/sec) | MuxPDU Header | | Primary Traffic (bits/ block) | Signaling Traffic (bits/ block) | Secondary Traffic (bits/block) | Permitted on | | | |
|---|---|---|---|---|---|---|---|---|---|
| | Mixed Mode (MM) | Frame Mode (FM) | | | | F C H | D C C H | S C C H | S C H |
| 14400 | '0' | - | 266 | 0 | 0 | Y | Y | Y | Y |
| | '1' | '0000' | 124 | 138 | 0 | Y | Y | N | N |
| | '1' | '0001' | 54 | 208 | 0 | Y | Y | N | N |
| | '1' | '0010' | 20 | 242 | 0 | Y | Y | N | N |
| | '1' | '0011' | 0 | 262 | 0 | Y | Y | N | N |
| | '1' | '0100' | 124 | 0 | 138 | Y | Y | N | N |
| | '1' | '0101' | 54 | 0 | 208 | Y | Y | N | N |
| | '1' | '0110' | 20 | 0 | 242 | Y | Y | N | N |
| | '1' | '0111' | 0 | 0 | 262 | Y | Y | Y | Y |
| | '1' | '1000' | 20 | 222 | 20 | Y | Y | N | N |
| 7200 | '0' | - | 124 | 0 | 0 | Y | N | N | N |
| | '1' | '000' | 54 | 67 | 0 | Y | N | N | N |
| | '1' | '001' | 20 | 101 | 0 | Y | N | N | N |
| | '1' | '010' | 0 | 121 | 0 | Y | N | N | N |
| | '1' | '011' | 54 | 0 | 67 | Y | N | N | N |
| | '1' | '100' | 20 | 0 | 101 | Y | N | N | N |
| | '1' | '101' | 0 | 0 | 121 | Y | N | N | N |
| | '1' | '110' | 20 | 81 | 20 | Y | N | N | N |
| 3600 | '0' | - | 54 | 0 | 0 | Y | N | N | N |
| | '1' | '00' | 20 | 32 | 0 | Y | N | N | N |
| | '1' | '01' | 0 | 52 | 0 | Y | N | N | N |
| | '1' | '10' | 20 | 0 | 32 | Y | N | N | N |
| | '1' | '11' | 0 | 0 | 52 | Y | N | N | N |
| 1800 | '0' | - | 20 | 0 | 0 | Y | N | N | N |
| | '1' | - | 0 | 0 | 20 | Y | N | N | N |

Fig. 2C

RELATED ART

|  | MuxPDU Header ||  Traffic bits/ block |
| --- | --- | --- | --- |
|  | sr_id | Reserved | |
| Rate Set 1 | '001'-'110' | '000' | 170/346 |
| | '111' | '000' | 0 |
| Rate Set 2 | '001'-'110' | '000' | 266/538 |
| | '111' | '000' | 0 |

| kind of traffic | | priority |
|---|---|---|
| Signaling | Signaling | 1 |
| Data | RLP SYNK frame | 2 |
| | RLP SYNK ACK frame | 3 |
| | RLP ACK frame | 4 |
| | RLP NAK frame | 5 |
| | RLP Retransmission frame | 6 |
| | RLP NEW frame | 9 |
| | RLP RLP frame | 12 |
| Voice | Full Rate | 7 |
| | Half Rate | 8 |
| | Quarter Rate | 10 |
| | Eighth Rate | 11 |

METHOD OF PROCESSING TRAFFIC IN A MOBILE COMMUNICATION SYSTEM

BACKGROUND OF THE INVENTION

1. Field of the Invention

The present invention generally relates to communication systems, and more particularly to a system and method for managing traffic in a mobile communication system.

2. Description of the Prior Art

In a multiplex sub-layer of a CDMA (Code Division Multiple Access) system, various kinds of traffic are converted into and transmitted as information having a physical layer SDU (Service Data Unit). When received, this information is separated and processed based on the kind of traffic. In the multiplex sub-layer, the type of multiplexing performed is based on a multiplex option determined in the course of contracting services between an MS (Mobile Station) provided with a mobile communication service and a BS (Base Station). Different kinds of traffic are combined in a predetermined way according to each of the multiplexing types.

Figure 1:
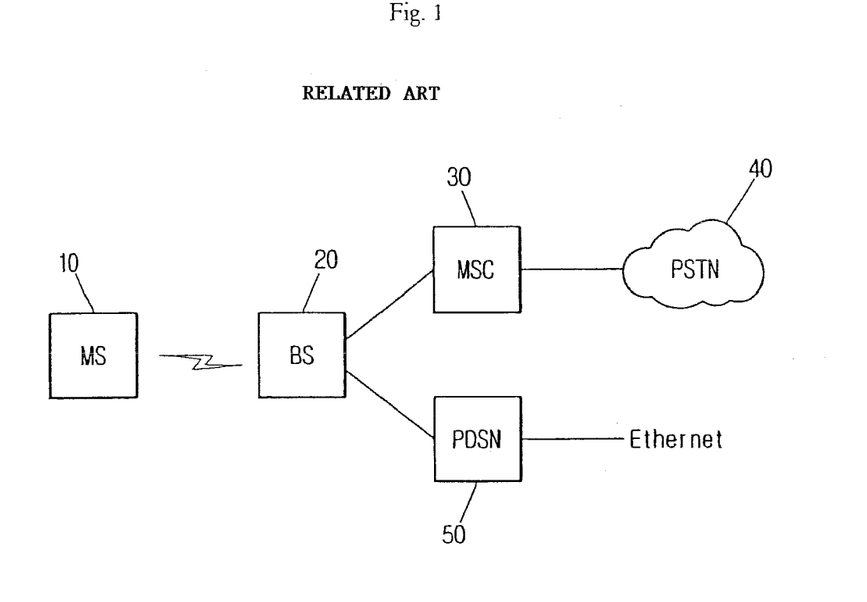
FIG. 1 is a schematic diagram showing a construction of a mobile communication system; according to the related art.

FIG. 1 is a schematic block diagram showing a construction of a related-art mobile communication system. This system includes an MS 10 which transmits or receives various kinds of traffic such as a signaling traffic, a voice traffic, a data traffic to or from a BS 20 through an allocated traffic path.

The BS provides the MS not only with a voice service through an MSC (Mobile Switching Center) 30 and a PSTN (public Switched Telephone Network) 40, but also with a data service through a PDSN (Packet Data Service Node) 50 and an Ethernet. Here, the BS functions to multiplex the voice and data traffic transceived through the multiplex sub-layer (not shown) according to the corresponding multiplexing type.

Figure 2A:
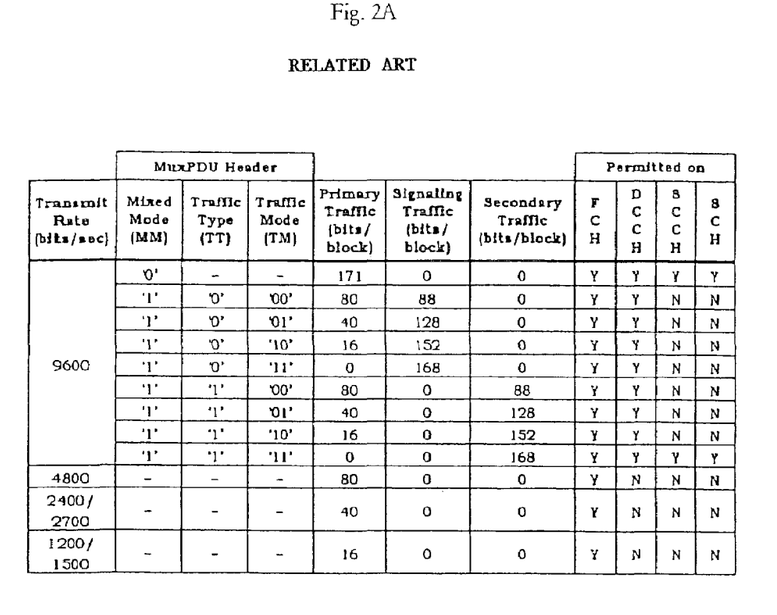
FIGS. 2A to 2C show different multiplexing types.
Figure 2B:
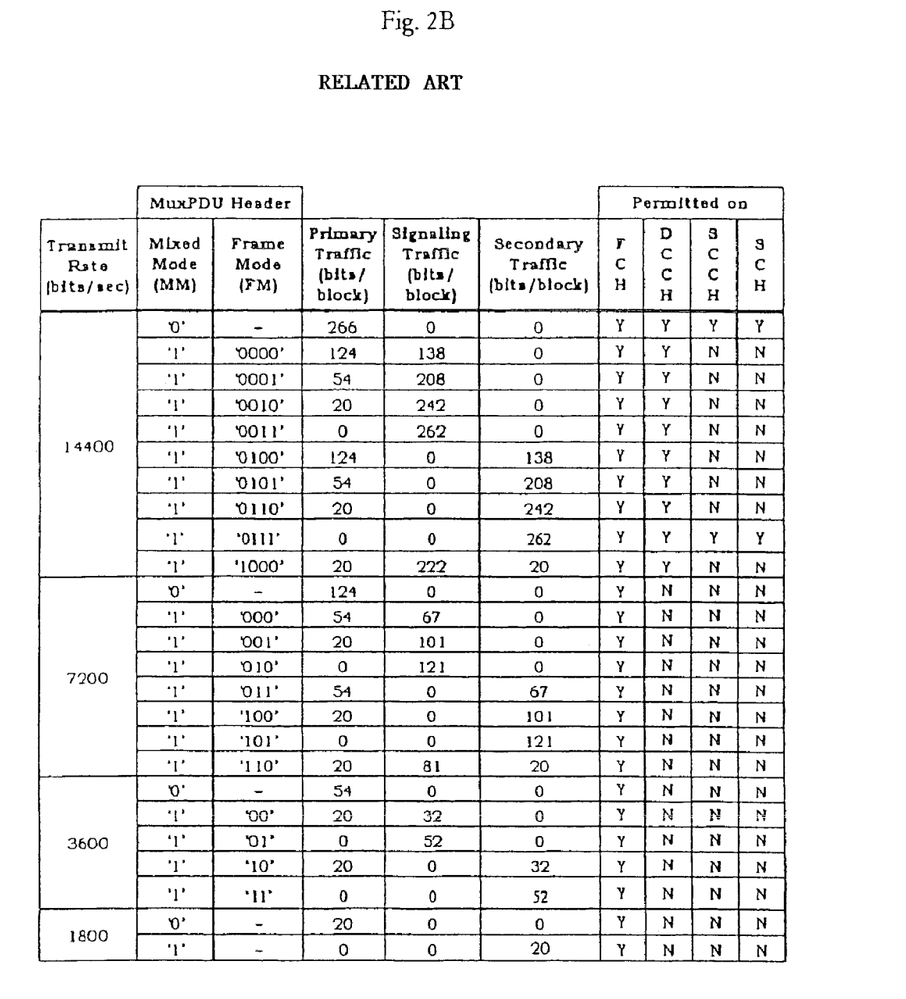
Figure 2C:
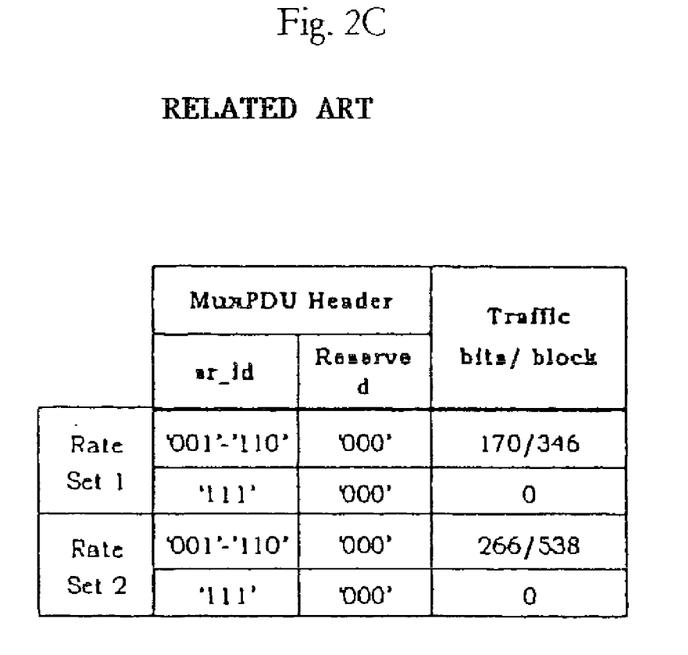
Figure 3:
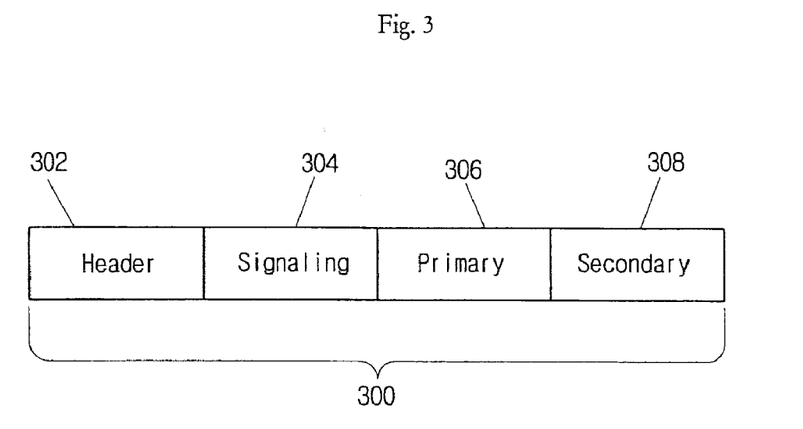
FIG. 3 shows transmission traffic in a multiplex sub-layer.

FIGS. 2A to 2C show types of multiplexing, and FIG. 3 show a structure of transmission traffic multiplexed and transmitted in a multiplex sub-layer. Referring to FIGS. 2A to 3, the multiplex sub-layer converts and transmits received traffic into transmission traffic 300 according to a multiplex type predetermined by a previous contract. The transmission traffic includes a combination of a header 302, signaling traffic 304, primary traffic 306, and secondary traffic 308.

A block for the signaling traffic 304 (hereinafter, referred to as a "signaling block") is stored with the signaling traffic. A block for the primary traffic 306 (hereinafter, referred to as a "primary block") is stored with the voice traffic. And, a block for the secondary traffic 308 (hereinafter, referred to as a "secondary block") is stored with the data traffic. For instance, in the case where the received traffic is the data traffic having a transmit rate of 4800 bit/sec, which is classified into multiplex type 1, the corresponding data traffic is transmitted over the primary block 306 having a size of 80 bits without the header 302 set by any value.

There is no conventional service capable of combining the voice traffic and data traffic. Thus, voice service is provided by transmitting the signaling traffic and the voice traffic in that order, while data service is provided by transmitting the signaling traffic and data traffic in that order.

As mobile communications technology continues to develop, it is anticipated that a technique for simultaneously providing voice and data services, i.e., an SVD (Simultaneous Voice and Data) service, will be needed so that signal processing procedures such as a scheme of exchanging signaling messages between the MS and BS for a corresponding SVD service can be standardized. Present standards do not provide details or any other information about combining voice traffic and data traffic or of allocating priority to data transmissions based on the type of traffic included in the transmissions.

SUMMARY OF THE INVENTION

An object of the present invention is to solve one or more of the above-mentioned problems occurring in the related art.

Another object of the present invention is to provide a system and method which simultaneously provides voice and data services, by assigning priorities based on the type of traffic transmittal received in a communications system.

Another object of the present invention is to provide a system and method of processing traffic in a mobile communication system which provides good quality SVD service by classifying the traffic, allocating each of the classified traffic with a priority optimal for a condition of the system, and performing multiplexing based on a multiplex type using the corresponding priority.

It is another object of the present invention to provide a system and method which allocates priority to data and voice traffic in a manner which ensures that voice traffic will be transmitted and that no deterioration in quality occurs, thereby ensuring that smooth voice service is provided.

In order to accomplish these and other objects and advantages, the present invention provides a method of processing traffic in a mobile communication system, including: classifying the traffic according to each kind; allocating a priority to each kind of the classified traffic; and when data is received, multiplexing the traffic and transmitting the received data according to the allocated priority.

Classifying the traffic is preferably carried out by classifying the traffic into a signaling traffic, a data traffic and a voice traffic and by re-classify each of the data traffic and each of the voice traffic. It is also preferred that the data traffic is classified into an Radio Link Protocol (RLP) control frame, an RLP new frame, and other RLP frames. The RLP control frame is preferably classified into an RLP SYNC frame, an RLP SYNC ACK frame, an RLP ACK frame, an RLP NAK frame and an RLP retransmission frame. The voice traffic is preferably classified into a full rate voice traffic, a half rate voice traffic, a quarter rate voice traffic, and an eighth rate voice traffic, on the basis of an output rate of a vocoder.

Further, the priorities of the traffic are preferably set in order of a signaling traffic, an Radio Link Protocol (RLP) control frame, a full rate voice traffic, a half rate voice traffic, an RLP new frame, a quarter rate voice traffic, an eighth rate voice traffic, and other RLP frames except for the RLP control frame and the RLP new frame in response to a condition of a system.

Preferably, multiplexing the received traffic includes: storing a traffic having a higher priority among the received traffic in a corresponding block of a transmission traffic according to a preset multiplex type; checking whether or not a reserved block exists within the transmission traffic; if the reserved block exists, checking whether or not a traffic having a lower priority exists among the received traffic; and if the lower priority of traffic exists, processing the lower priority traffic in order to have a size enough to be stored on the reserved block and storing the processed traffic on the reserved block of the transmission traffic.

Even more preferably, if the higher priority traffic is a signaling traffic, the signaling traffic is stored in a signaling block of the transmission traffic and, according to a kind of the lower priority traffic, a voice traffic is stored in a primary block of the transmission traffic after processing the voice traffic in order to have a size enough to be stored on the reserved block and a data traffic is stored in a secondary block of the transmission traffic after processing the data traffic in order to have a size enough to be stored on the reserved block.

Further, it is preferable that if the higher priority traffic is a data traffic, the data traffic is stored in a secondary block of the transmission traffic and a voice traffic, the lower priority traffic, is stored in a primary block of the transmission traffic after processing the voice traffic in order to have a size enough to be stored on the reserved block.

Even more preferably, the voice traffic is processed by controlling the output rate of the vocoder. Further, it is preferable that, if the higher priority traffic is a voice traffic, the voice traffic is stored in a primary block of the transmission traffic and a data traffic having a priority lower than the voice traffic is stored in a secondary block of the transmission traffic after processing the data traffic in order to have a size enough to be stored on the reserved block.

DETAILED DESCRIPTION OF THE PREFERRED EMBODIMENTS

Figure 4:
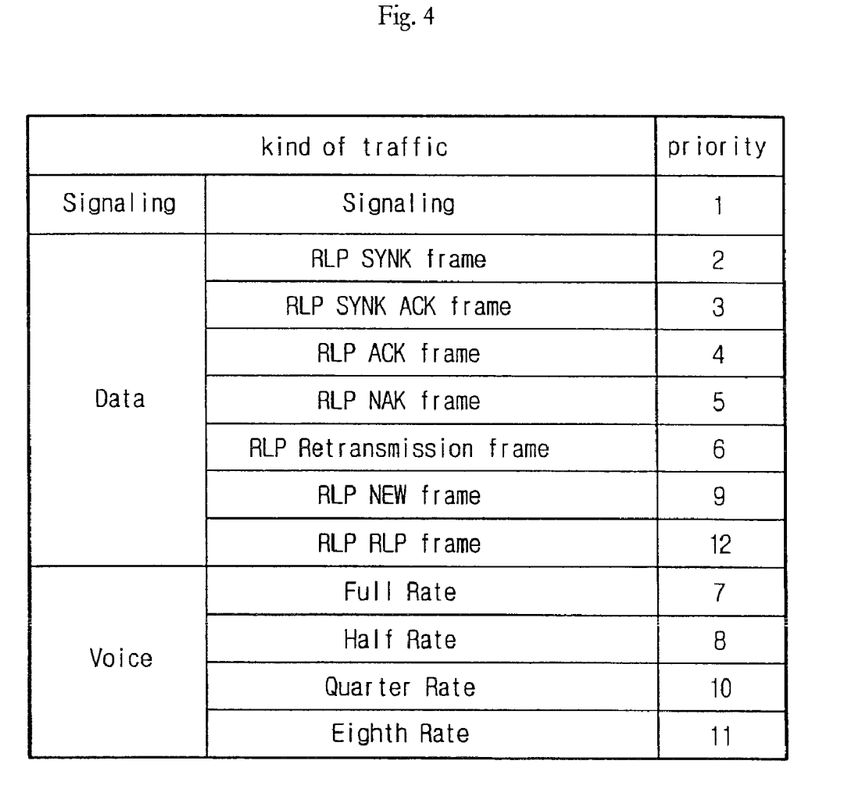
FIG. 4 shows kinds and priorities of traffic according to one embodiment of the present invention.

FIG. 4 shows kinds and priorities of traffic according to one embodiment of the present invention. This traffic is classified into signaling traffic, data traffic, and voice traffic according to a service option. The data traffic is classified again into RLP (Radio Link Protocol) control information, an RLP new frame as a new data traffic, and other RLP frames needed to be transmitted. The RLP control information includes an RLP SYNC frame, an RLP SYNC ACK frame, an RLP ACK frame, an RLP NAK frame and an RLP retransmission frame.

The voice traffic is classified into a full rate voice traffic, a half rate voice traffic, a quarter rate voice traffic, and an eighth rate voice traffic according to an output rate of a vocoder. If necessary, the traffic may be additionally classified, or some of the classified traffic may be integrated into one.

The kinds of traffic classified in the aforementioned manner preferably have priority in the following order: signaling traffic, RLP SYNC frame, RLP SYNC ACK frame, RLP ACK frame, RLP NAK frame, RLP retransmission frame, full rate voice traffic, half rate voice traffic, RLP New frame, quarter-rate voice traffic, eighth rate voice traffic, and other RLP frames.

The priority defined above is preferably varied according a condition of the system. For example, when an SCH (Supplemental Channel) is allocated, voice traffic having any one of full/half/quarter/eighth rates as the output rate of the vocoder can be prior to the RLP retransmission frame, which can be transmitted through the SCH except for the RLP frames (SYNC, SYNC ACK, ACK, NAK) which can be transmitted only through an FCH (Fundamental Channel) because the voice traffic can be transmitted through the SCH. Further, if it is determined that only the voice traffic from the full-rate to the quarter-rate or the output rate of the vocoder are significant traffic, the voice traffic having the quarter rate can be prior to the RLP new frame.

A base station receiving traffic through a predetermined traffic path carries out multiplexing corresponding to multiplex type, which is previously determined based on the kinds and priorities of the traffic received through the multiplex sub-layer.

Taking one example for illustrative purposes, it may be assumed that traffic 300 as in FIG. 3 is formed and transmitted in the multiplex sub-layer according to multiplex type 1 of FIG. 2A. In the multiplex sub-layer, when received the traffic includes the signaling traffic having the highest priority, the signaling traffic is transmitted after being stored on the signaling block. In contrast, in multiplex type 1, because the signaling traffic 304 and the secondary traffic 308 are simultaneously transmitted, only the output rate of the vocoder stored on the primary block is controlled.

Also, in multiplex type 1, the output rate of the vocoder is 171 bits/block for the full rate, 80 bits/block for the half rate, 40 bits/block for the quarter rate, and 16 bits/block for the eighth rate. Thus, according to the definition of multiplex type 1, when the signaling traffic 304 has the full rate (168 bits/block) or when bits allocated to the signaling block are all occupied, no voice traffic is transmitted because no reserved bit is allocated to the primary block. Only the signaling traffic 304 stored with the signaling traffic having the full rate is transmitted together with the header 302 set by a predetermined value.

However, when the signaling traffic 304 does not have the full rate, the output rate of the vocoder is determined or the half-rate, the quarter-rate, or the eighth-rate based on the reserved bits remaining at the primary block, and then the voice traffic is transmitted. In other words, when the signaling traffic 304 has, for example, a ⅞ rate (152 bits/block), reserved bits of a ⅛ rate (40 bits/block) are left on the primary block As a result, the output rate of the vocoder is determined to be the eighth-rate capable of storing on the primary block.

When the received traffic does not include the signaling traffic having the first priority, the voice and data traffic are transmitted after being stored on the primary block and the secondary block respectively at a predetermined rate according to the priority of processing the traffic. For example, when the received traffic includes the RLP control information having the second priority next to that of the signaling traffic, the output rate of the vocoder of the voice traffic for storing on the remaining reserved bits of the primary block is determined according to a rate of the secondary traffic 308 on which the RLP control information is stored, and then the determined rate of voice traffic is stored on the primary block, and the RLP control information is stored on the secondary block and then transmitted.

When the received traffic is stored with the data traffic having a priority lower than that of the voice traffic, the voice traffic is stored on the primary block first, and the corresponding data traffic is stored and transmitted on the remaining bit space of the secondary block according to a rate of the primary traffic 306 on which the voice traffic is stored.

Figure 5:
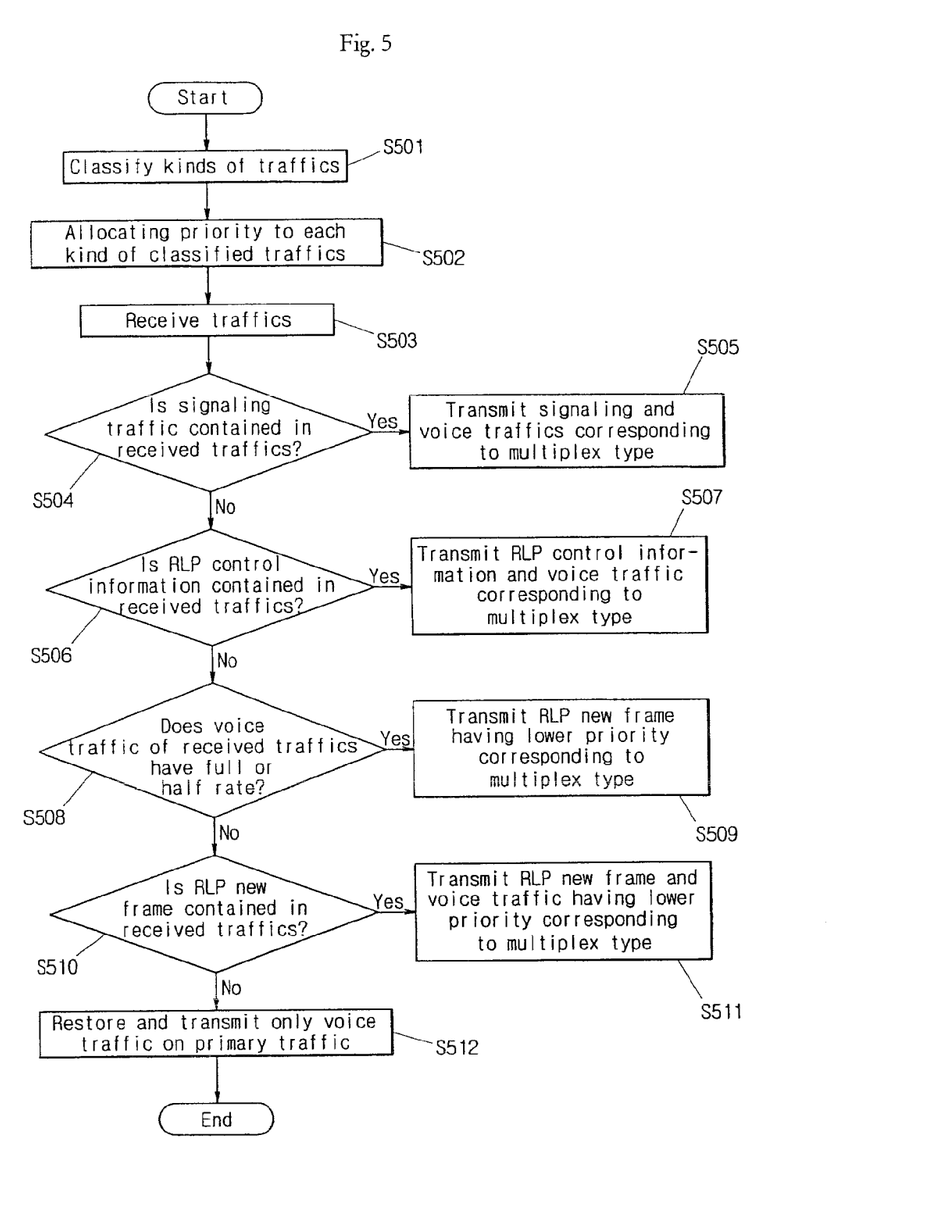
FIG. 5 is a flow chart showing a traffic processing procedure in a mobile communication system according to one embodiment of the present invention.
Figure 6:
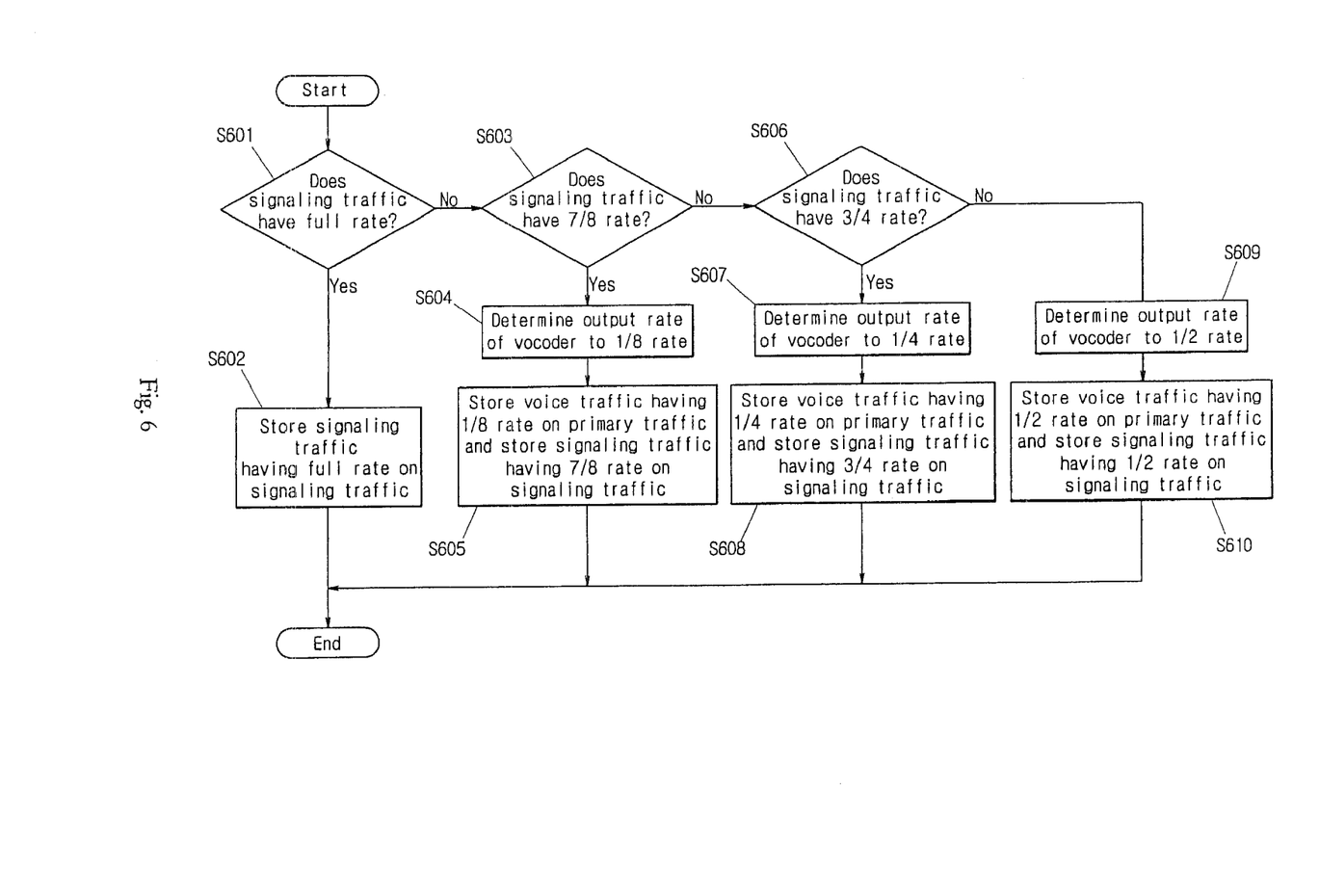
FIG. 6 is a flow chart showing a multiplexing procedure in the case that a traffic having a priority is a signaling traffic according to one embodiment of the present invention.

FIG. 5 is a flow chart showing steps included in a traffic processing procedure in a mobile communication system according to one embodiment of the present invention. In this procedure, the multiplex sub-layer of the BS functions to multiplex the signaling traffic, the data traffic or the voice traffic all of which are contained in the received traffic, classify the traffic into various kinds such as in FIG. 4 (S501), and allocate priority to the kinds of the classified traffic (S502). Then, when the different types of traffic are received through a predetermined traffic path (S503), it is checked whether or not the received traffic includes the signaling traffic having the first priority (S504). If the received traffic includes the signaling traffic, the transmission traffic 300 is transmitted after being formed through multiplexing of the signaling and voice traffic according to the corresponding multiplex type (S505) FIG. 6 shows steps included in a procedure of multiplexing signaling and voice traffic.

Figure 7:
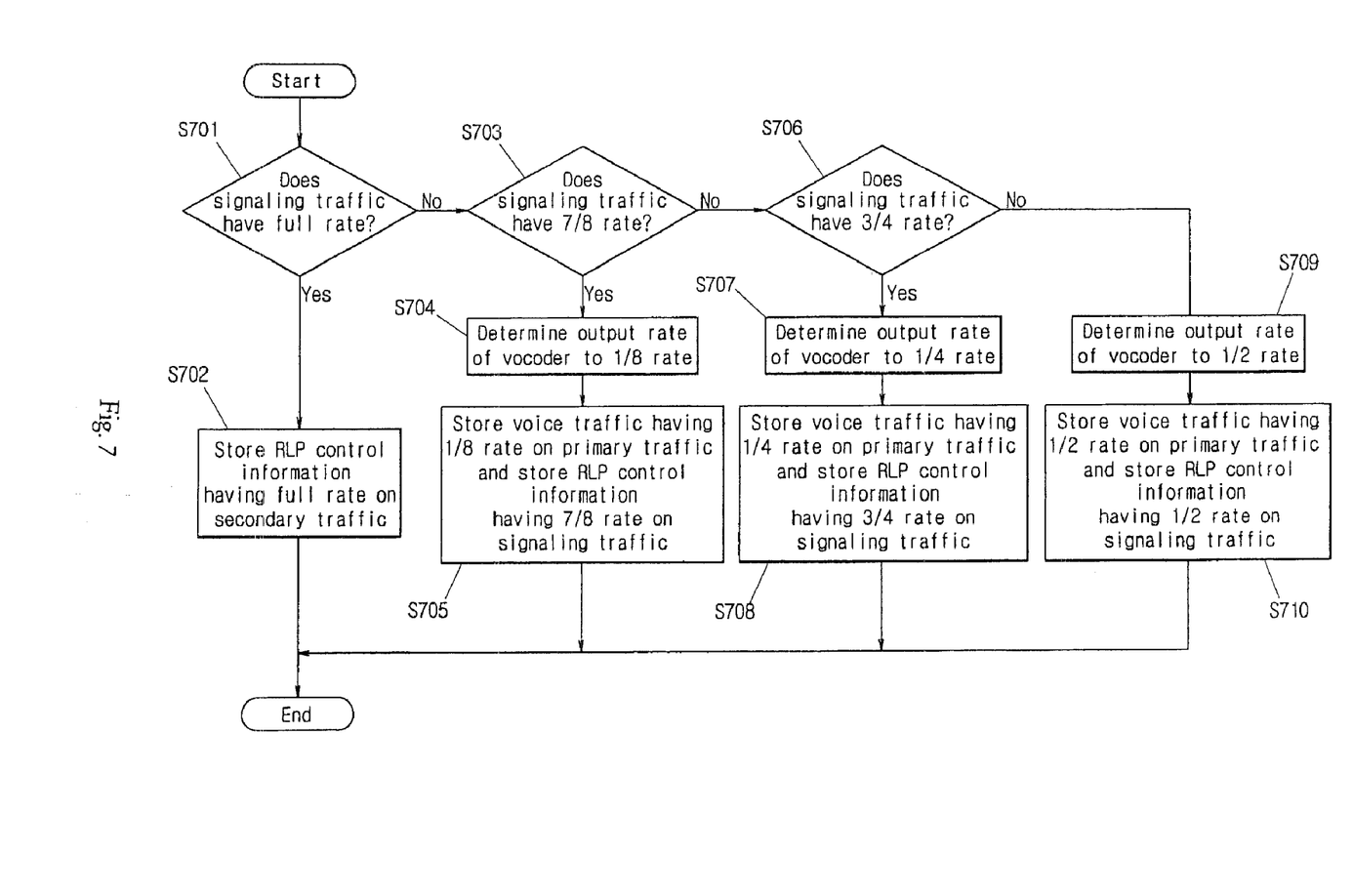
FIG. 7 is a flow chart showing a multiplexing procedure in the case that a traffic having a priority is an RLP control information according to one embodiment of the present invention.

If the received traffic does not include the signaling traffic, it is checked whether or not the traffic includes the RLP control information next to the signaling traffic in the priority for processing the traffic (S506). If the RLP control information is contained in the received traffic, the transmission traffic 300 is transmitted after being formed through multiplexing of the RLP control information and the voice traffic according to the corresponding multiplex type (S507). FIG. 7 shows steps included in a procedure of multiplexing the RLP control information and the voice traffic.

As the result of the checking in step S506, if the traffic does not include the RLP control information, it is checked whether or not the traffic includes the voice traffic, which has the full-rate or half-rate as the output rate of the vocoder, next to the RLP control information in the priority for processing the traffic (S508).

Figure 8:
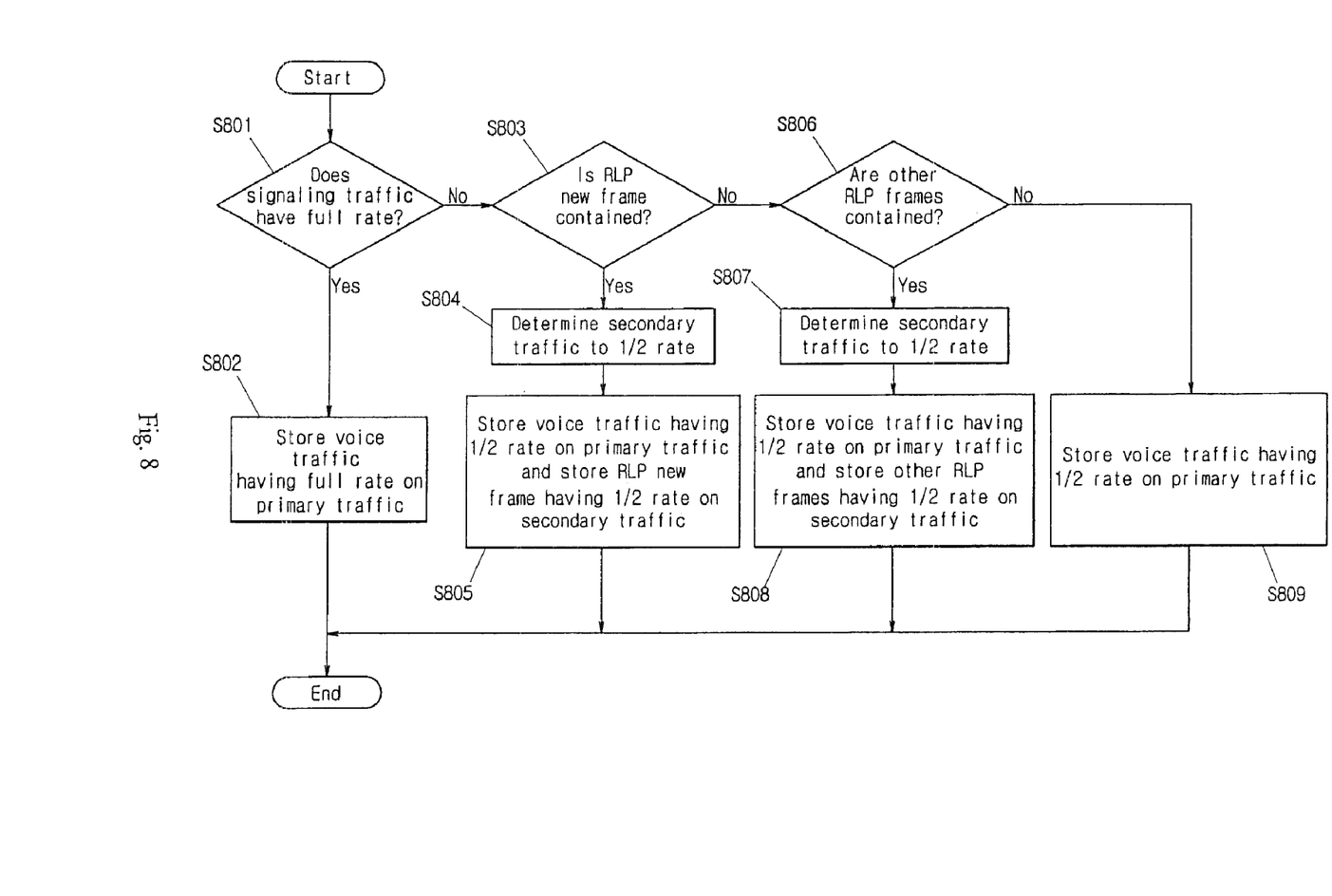
FIG. 8 is a flow chart showing a multiplexing procedure in the case that a traffic having a priority is a full or half rate voice traffic according to one embodiment of the present invention.

If the output rate of the vocoder of the voice traffic contained in the traffic is full-rate or half-rate, both the voice traffic having the full rate or the half rate and the data traffic having a priority lower than that of the voice traffic except the RLP control information are multiplexed according to the corresponding multiplex type to form and transmit the transmission traffic 300 (S509). FIG. 8 shows steps included in a procedure of multiplexing the voice traffic having the full or half-rate and the data traffic having a priority lower than that of the voice traffic.

As a result of checking in step S508, if the output rate of the vocoder of the voice traffic contained in the traffic is not the full rate or the half rate, it is checked whether or not the data traffic contained in the traffic is the RLP new frame, as a new data traffic, having a priority next to that of the voice traffic having the full or half rate (S510).

Figure 9:
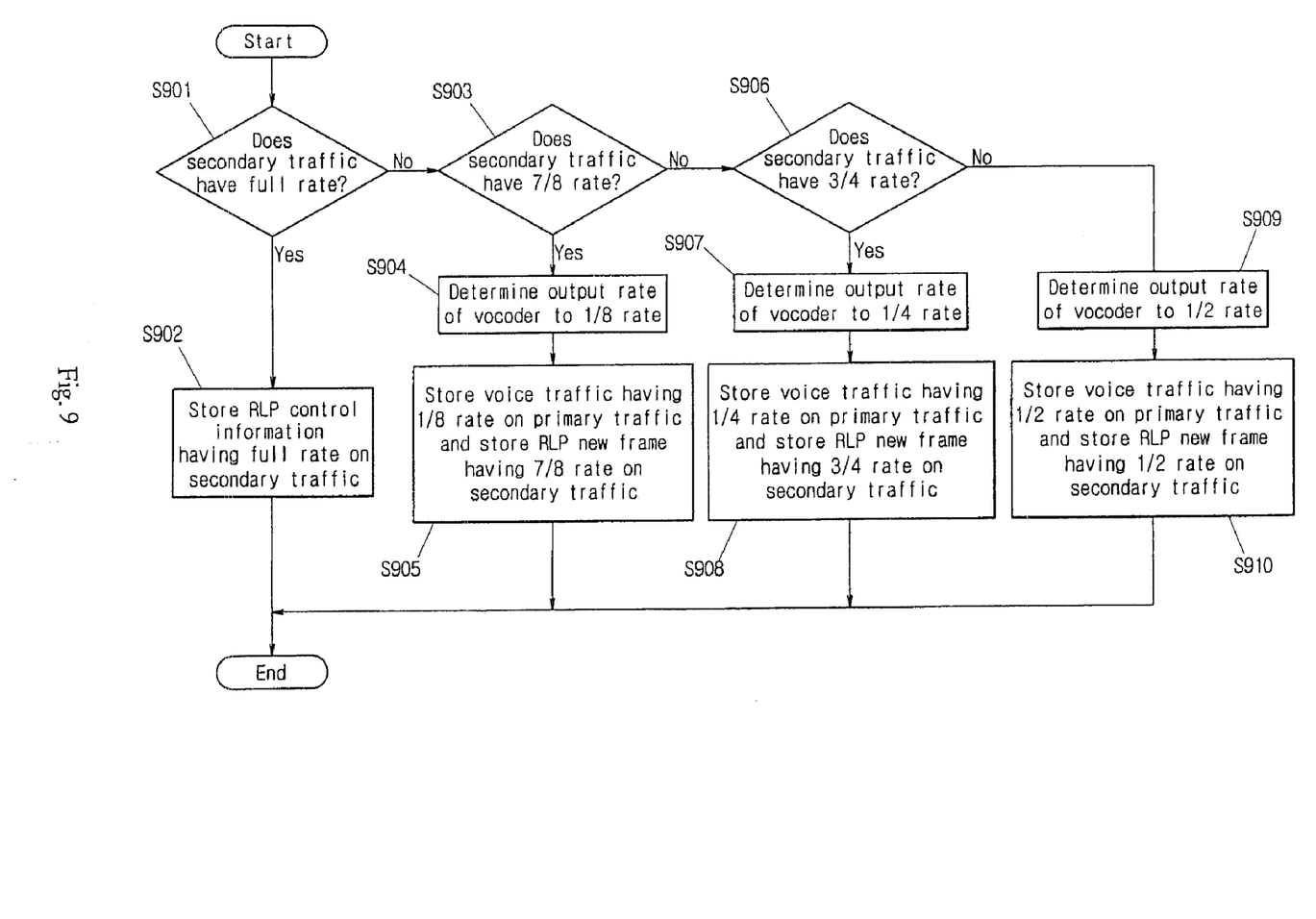
FIG. 9 is a flow chart showing a multiplexing procedure in the case that a traffic having a priority is an RLP new frame according to one embodiment of the present invention.

If the data traffic contained in the traffic are the RLP new frame, the RLP new frame and the voice traffic (of the quarter or eighth rate) having a priority lower than that of the RLP new frame are multiplexed according to the corresponding multiplex type to form and transmit the transmission traffic 300 (S511). FIG. 9 shows steps included in a procedure of multiplexing the RLP new frame and the voice traffic having a priority lower than that of the RLP new frame.

As a result of checking in step S510, if the traffic do not include the RLP new frame, only the voice traffic having the quarter or eighth rate as the output rate of the vocoder is formed into and transmitted as the transmission traffic 300 according to the multiplex type (S512).

FIG. 6 is a flow chart showing steps included in a multiplexing procedure based on a multiplex type in the case that received traffic includes signaling traffic according to one embodiment of the present invention. When a signaling traffic contained in the received traffic is stored on the corresponding block, the multiplex sublayer checks whether or not the signaling traffic 304 has the full rate (S601). If the signaling traffic 304 has the full rate, the signaling traffic is stored on the signaling block, and then only the corresponding signaling traffic is transmitted after a predetermined value is set to the header 302 (S602). However, if the signaling traffic 304 does not have the full-rate, it is checked whether the signaling traffic 304 has a ⅞ rate (S603).

If signaling traffic 304 has a ⅞ rate, the output rate of the vocoder of the voice traffic contained in the received traffic is determined to a ⅛ rate which can occupy the remaining bit space of the primary block (S604). Then, the voice traffic having the ⅛ rate is stored on the primary block and the signaling traffic having the ⅞ rate is stored on the signaling block The stored voice and signaling traffic are then transmitted (S605).

As a result of the checking performed in step S603, if the signaling traffic 304 does not have a ⅞ rate, it is checked whether or not the signaling traffic 304 has a ¾ rate (S606). If the signaling traffic 304 has a ¾ rate, the output rate of the vocoder of the voice traffic contained in the received traffic is determined to a ¼ rate (S607), and then the voice traffic having the ¼ rate is stored on the primary block and the signaling traffic having the ¾ rate is stored on the signaling block. The stored voice and signaling traffic are then transmitted (S608).

As a result of the checking performed in step S606, if the signaling traffic 304 does not have the ¾ rate but a ½ rate, the output rate of the vocoder of the voice traffic contained in the received traffic is determined to a ½ rate (S609). Then, the voice traffic having the ½ rate is stored on the primary block and the signaling traffic having the ½ rate is stored on the signaling block. The stored voice and signaling traffic are then transmitted (S610).

FIG. 7 is a flow chart showing steps included in a multiplexing procedure based on a multiplex type in the case that received traffic do not include a signaling traffic but RLP control information according to one embodiment of the present invention. In an intial step, the multiplex sub-layer checks whether or not the secondary traffic 308, on which RLP control information contained in the received traffic is stored, has the full rate (S701). If the secondary traffic 308 has the full rate, the RLP control information is stored on the secondary block Only the corresponding secondary traffic 308 setting a predetermined value to the header 302 is transmitted (S702).

As a result of the checking performed in step S702, if the secondary traffic 308 does not have the full-rate, it is checked whether or not the secondary traffic 308 has a ⅞ rate (S703). If the secondary traffic 308 has a ⅞ rate, the output rate of the vocoder of the voice traffic contained in the received traffic is determined to a ⅛ rate (S704). Then, the voice traffic having the ⅛ rate is stored on the primary block and the RLP control information having the ⅞ rate is stored on the secondary block. The stored voice traffic and RLP control information are then transmitted (S705).

As a result of the checking performed in step S703, if the secondary traffic 308 does not have a ⅞ rate, it is checked whether or not the secondary traffic 308 has a ¾ rate (S706). If the secondary traffic 308 has a ¾ rate, the output rate of the vocoder of the voice traffic contained in the received traffic is determined to a ¼ rate (S707). Then, the voice traffic having the ¼ rate is stored on the primary block and the RLP control information having the ¾ rate is stored on the secondary block. The stored voice traffic and RLP control information are then transmitted (S708).

As a result of the checking preformed in step S706, if the secondary traffic 308 does not have the ¾ rate but a ½ rate, the output rate of the vocoder of the voice traffic contained in the received traffic is determined to a ½ rate (S709). Then, the voice traffic having the ½ rate is stored on the primary block and the RLP control information having the ½ rate is stored on the secondary block The stored voice traffic and RLP control information are then transmitted (S710).

FIG. 8 is a flow chart showing steps included in a multiplexing procedure based on a multiplex type, in the case where received traffic do not include a signaling traffic and RLP control information but a voice traffic having a full or half-rate. In an initial step, the multiplex sub-layer checks whether or not the primary traffic 306, on which the voice traffic having the full or half rate contained in the received traffic is stored, has the full rate (S801). If the primary traffic 306 has the full rate, i.e., the full rate as the output rate of the vocoder of the corresponding voice traffic, the voice traffic having the full rate is stored on the primary block. Then, only the corresponding primary traffic 306 set with a predetermined value in header 302 is transmitted (S802).

As a result of the checking performed in step S801, if the primary traffic 306 does not have the full rate, i.e., if the primary traffic 306 has a ½ rate equal to a ½ rate as the output rate of the vocoder of the corresponding voice traffic, it is checked whether or not the received traffic include a RLP new frame having the next priority (S803). If the received traffic include the RLP new frame, the secondary traffic 308 is determined to a ½ rate (S804), the voice traffic having the ½ rate is stored on the primary block, and the RLP new frame having the ½ rate is stored on the secondary block The stored voice traffic and RLP new frame are then transmitted (S805).

However, as a result of the checking performed in step S803, if the received traffic does not the RLP new frame, it is checked whether or not the received traffic include other RLP frames to be transmitted (S806). If the received traffic include other RLP frames, the secondary traffic 308 is determined to a ½ rate (S807), the voice traffic having the ½ rate is stored on the primary block, and the other RLP frames having the ½ rate are stored on the secondary block. The stored voice traffic and RLP frames are then transmitted (S808).

As a result of the checking performed in step S806, if the received traffic does not include other RLP frames, the voice traffic having the ½ rate is stored on the primary block and then only the corresponding primary traffic is transmitted (S809).

FIG. 9 is a flow chart showing steps included in a multiplexing procedure based on the corresponding multiplex type, in the case were received traffic do not include a signaling traffic and RLP control information but a voice traffic having a quarter or eighth rate and a RLP new frame according to one embodiment of the present invention. In an initial step, the multiplex sub-layer checks whether or not secondary traffic 308 on which an RLP new frame having a higher priority has the full rate (S901). If the secondary traffic 308 has the full rate, the RLP new frame is stored on the secondary block and then only the corresponding secondary traffic 308 is transmitted (S902).

However, as a result of the checking performed in step S901, if the secondary traffic 308 does not have the full-rate, it is checked whether or not the secondary traffic 308 has a ⅞ rate (S903). If the secondary traffic 308 has a ⅞ rate, the output rate of the vocoder of the voice traffic contained in the received traffic is determined to a ⅛ rate (S904). Then, the voice traffic having the ⅛ rate is stored on the primary block and the RLP new frame having ⅞ rate is stored on the secondary block The stored voice traffic and RLP new frame are then transmitted (S905).

As a result of the checking performed in step S903, if the secondary traffic 308 does not have the ⅞, it is checked whether the secondary traffic 308 has a ¾ rate (S906). If the secondary traffic 308 has a ¾ rate, the output rate of the vocoder of the voice traffic contained in the received traffic is determined to a ¼ rate (S907). Then, the voice traffic having the ¼ rate is stored on the primary block and the RLP new frame having ¾ rate is stored on the secondary block. The stored voice traffic and RLP new frame are then transmitted (S908).

As a result of the checking performed in step S906, if the secondary traffic 308 has not a ¾ rate but a ½ rate, the output rate of the vocoder of the voice traffic contained in the received traffic is determined to a ½ rate (S909). Then, the voice traffic having the ½ rate is stored on the primary block and the RLP new frame having ½ rate is stored on the secondary block The stored voice traffic and RLP new frame are then transmitted (S910).

As previously mentioned above, according to the present invention by classifying traffic, allocating a priority to each kind of the classified traffic, and performing multiplexing according to the corresponding priority, it is possible to provide good quality SVD service by avoiding interruptions in transmission of a certain kind of traffic due to another kind of traffic.

Although one embodiment of the present invention has been described on the multiplexing procedures based on the multiplex type 1 for illustrative purposes, those skilled in the art will appreciate that it can be applied to other multiplex types, and that it is possible to make various modifications, additions and substitutions, without departing from the scope and spirit of the invention as disclosed in the accompanying claims.

What is claimed is:

1. A method of processing traffic in a mobile communication system, comprising:
    classifying different kinds of traffic;
    allocating a priority to each kind of classified traffic; and
    when different kinds of traffic are received, multiplexing the different kinds of traffic and transmitting the multiplexed traffic according to the allocated priority, wherein said multiplexing comprises:
    storing traffic having a higher priority of the received traffic in a corresponding block of transmission traffic according to a preset multiplex type;
    checking whether or not a reserved block exists within the transmission traffic;
    if the reserved block exists, checking whether or not traffic having a lower priority exists among the received traffic; and if the lower priority traffic exists, processing the lower priority traffic to have a size sufficient to be stored on the reserved block and storing the processed traffic on the reserved block of the transmission traffic.

2. The method of claim 1, wherein classifying the traffic includes:
classifying the traffic into signaling traffic, data traffic, and voice traffic and then classifying each of the data traffic and voice traffic.

3. The method of claim 2, wherein the data traffic is classified into at least a Radio Link Protocol (RLP) control frame and an RLP new frame.

4. The method of claim 3, wherein RLP control frame classifications include: an RLP SYNC frame, an RIP SYNC ACK frame, an RIP ACK frame, an RIP NAK frame, and an RLP retransmission frame.

5. The method of claim 2, wherein voice traffic classifications include:
a full-rate voice traffic, a half-rate voice traffic, a quarter-rate voice traffic, and an eighth-rate voice traffic determined on the basis of an output rate of a vocoder.

6. The method of claim 1, wherein the priorities of the different kinds of traffic are set in order of signaling traffic, an Radio Link Protocol (RLP) control frame, full-rate voice traffic, a half-rate voice traffic, an RIP new frame, a quarter-rate voice traffic, an eighth-rate voice traffic, in response to a condition of a system except for the RLP control frame and the RLP new frame.

7. The method of claim 1, wherein if the higher priority traffic is signaling traffic, the signaling traffic is stored in a signaling block of the transmission traffic, and according to a kind of the lower priority traffic a voice traffic is stored in a primary block of the transmission traffic after the voice traffic is processed to have a size sufficient to be stored on the reserved block and a data traffic is stored in a secondary block of the transmission traffic after processing the data traffic in order to have a size enough to be stored on the reserved block.

8. The method of claim 1, wherein if the higher priority traffic is data traffic, wherein the data traffic is stored in a secondary block of the transmission traffic and voice traffic, or the lower priority traffic is stored in a primary block of the transmission traffic, after the voice traffic is processed in order to have a size sufficient to be stored on the reserved block.

9. The method of claim 7, wherein the voice traffic is processed by controlling the output rate of the vocoder.

10. The method of claim 8, wherein the voice traffic is processed by controlling the output rate of the vocoder.

11. The method of claim 1, wherein if the higher priority traffic is a voice traffic, the voice traffic is stored in a primary block of the transmission traffic and a data traffic having a priority lower than the voice traffic is stored in a secondary block of the transmission traffic, after the data traffic is processed to have a size sufficient to be stored on the reserved block.

12. The method of claim 1, wherein the different kinds of traffic and the multiplexed traffic include one or more of signaling packets, voice packets, or data packets.

13. A method of processing traffic in a mobile communication system, comprising:
classifying different kinds of traffic;
allocating a priority to each kind of classified traffic; and
when different kinds of traffic are received, multiplexing the different kinds of traffic and transmitting the multiplexed traffic according to the allocated priority, wherein said multiplexing includes:
(a) determining whether a first kind of received traffic has a first rate;
(b) determining that a second kind of received traffic has a second rate based on (a);
(c) determining whether or not a reserved block exists; and
(d) if a reserved block exists, processing one of first or second kinds of received traffic to have a size sufficient to be stored on the reserved block of the transmission traffic, wherein the first and second kinds of received traffic are stored in different transmission blocks of the transmission traffic based on (a) and (b) and (c).

14. The method of claim 13, wherein a sum of the first and second predetermined rates at least substantially equals a full vocoder rate.

15. The method of claim 13, wherein the different kinds of traffic and the multiplexed traffic include one or more of signaling packets, voice packets, or data packets.

16. The method of claim 13, further comprising:
changing priorities of the different kinds of traffic based on a condition of the mobile communication system.

17. A method of processing traffic in a mobile communication system, comprising:
classifying different kinds of traffic;
allocating a priority to each kind of classified traffic; and
when different kinds of traffic are received, multiplexing the different kinds of traffic and transmitting the multiplexed traffic according to the allocated priority, wherein said multiplexing includes:
(a) determining whether a first kind of received traffic having a first priority has a first rate;
(b) if the first kind of traffic does not have the first rate, then determining whether a second kind of traffic having a second priority has been received;
(c) if the second kind of traffic having the second priority has been received, then determining a rate of the second kind of traffic having the second priority; and
(d) storing the first and second kinds of traffic in different transmission blocks based on (a)-(c), said storinci including storing one of the first or second kinds of traffic in a reserved block of the transmission traffic and storing the other of the first or second kinds of traffic in another block of the transmission traffic.

18. The method of claim 17, wherein the different kinds of traffic and the multiplexed traffic include one or more of signaling packets, voice packets, or data packets.

19. The method of claim 17, further comprising:
changing priorities of the different kinds of traffic based on a condition of the mobile communication system.

* * * * *